(12) United States Patent
Kurian et al.

(10) Patent No.: US 12,475,404 B1
(45) Date of Patent: Nov. 18, 2025

(54) MONITORING, FORECASTING, AND DETECTING COMPROMISED COMMUNICATIONS USING QUANTUM COMPUTING AND ARTIFICIAL INTELLIGENCE

(71) Applicant: Bank of America Corporation, Charlotte, NC (US)

(72) Inventors: Manu Kurian, Dallas, TX (US); Jabir Mahammad, Tolichowki Hyderabad (IN); Michael G. Horstman, Chicago, IL (US); Sasikumar Purushothaman, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 91 days.

(21) Appl. No.: 18/666,968

(22) Filed: May 17, 2024

(51) Int. Cl.
*G06N 10/70* (2022.01)
*G06N 10/60* (2022.01)

(52) U.S. Cl.
CPC ............ *G06N 10/70* (2022.01); *G06N 10/60* (2022.01)

(58) Field of Classification Search
CPC .............................. G06N 10/60; G06N 10/70
USPC ......................................................... 726/26
See application file for complete search history.

(56) References Cited

U.S. PATENT DOCUMENTS

| | | | |
|---|---|---|---|
| 11,455,198 B1 * | 9/2022 | Singh | G06F 9/541 |
| 2022/0350898 A1 * | 11/2022 | Lv | H04L 9/16 |
| 2025/0097709 A1 * | 3/2025 | Balmakhtar | G06N 10/60 |

FOREIGN PATENT DOCUMENTS

| | | | | |
|---|---|---|---|---|
| CN | 113037478 A | * | 6/2021 | H04L 67/1001 |
| CN | 115208564 A | * | 10/2022 | H04L 12/4633 |
| CN | 116094712 A | * | 5/2023 | H04L 9/0855 |

* cited by examiner

*Primary Examiner* — David P Zarka
(74) *Attorney, Agent, or Firm* — Weiss & Arons LLP (57) ABSTRACT

Methods, systems and apparatus for detecting, monitoring and forecasting for compromised electronic communications in an electronic communication system. Methods may include isolating, from a historical database, electronic communications associated with a plurality of senders into individual data capsules. Methods may include generating and storing a predictive analytic profile for each sender based on a communication style identified for each sender. Methods may include filtering out compromised electronic communications using a dynamic quantum filter, the dynamic quantum filter including a dynamic condition set. Filtering may include inserting a quantum signature into each incoming electronic communication. Methods may include retrieving the predictive analytic profile associated with the sender identified for each incoming electronic communication. Methods may include assigning condition values to each electronic communication based on comparing each electronic communication to a corresponding predictive analytic profile. Methods may include determining whether the assigned condition values conform with the dynamic condition set.

20 Claims, 6 Drawing Sheets

QUANTUM ENTANGLEMENT

Quantum Superposition — 402

Quantum Entanglement — 408

MONITORING, FORECASTING, AND DETECTING COMPROMISED COMMUNICATIONS USING QUANTUM COMPUTING AND ARTIFICIAL INTELLIGENCE

FIELD OF TECHNOLOGY

Aspects of the disclosure relate to quantum computing and artificial intelligence.

BACKGROUND OF THE DISCLOSURE

Currently, many communications are transmitted via electronic communication platforms. Platforms that enable electronic communication may include email platforms, short messaging service ("SMS") platforms, multimedia messaging service ("MMS") platforms and any other suitable electronic communication platforms. These platforms typically utilize internet and/or network connections to transmit electronic communications. Internet and network connections may be vulnerable to scams and/or other nefarious activities. As such, electronic communications that are transmitted through platforms that utilize internet and/or network connections may also be subject to scams and/other nefarious activities from malicious actors.

Additionally, as artificial intelligence ("AI") continues to improve, malicious actors may harness the capabilities of the AI to improve the scams and nefarious activities. As such, scams and nefarious activities continuate to evolve and become more complex and realistic. Scams and nefarious activities that use AI may be more challenging to detect than conventional scams and nefarious activities. Because of the difficulty associated with detecting AI-based nefarious activities and malicious actors associated therewith, there may be an increase in undetected compromised communications.

As such, it would be desirable to provide a system using quantum computing and AI to monitor electronic communications to detect compromised communications. It would be further desirable for the system using quantum computing and AI to forecast compromised communications.

SUMMARY OF THE DISCLOSURE

Systems, apparatus and methods for detecting, monitoring and forecasting compromised electronic communications in an electronic communication system is provided.

The electronic communication system may be an email system, a short messaging service ("SMS") system, a multimedia messaging service ("MMS") system and/or any other suitable electronic communication system configured to transmit and receive electronic communications. Electronic communications may include emails, SMS messages, MMS messages and/or any other suitable electronic communication configured to be transmitted and received through an electronic communication system.

The electronic communication system may be operated by an entity. The entity may control and execute back-end software systems/processes to operate the electronic communication system. The entity operating the electronic communication system may be a first entity. The electronic communication system may be instantiated by a second entity. The second entity may be the same entity as the first entity. The second entity may be a different entity from the first entity. The second entity may include one or more users. Each of the one or more users may have an account on the electronic communication system.

The electronic communication system may be instantiated by a user. The user may not be part of the first and/or second entity. The user may have an account with the electronic communication system.

Accounts created via the electronic communication system may be an identity/authenticator created for each user. Each account may link a user, via user credentials, to the electronic communication system. The user credentials may include a username, a password and/or any other suitable user credentials. Each account may enable a user to access user specific settings, user specific data, user specific electronic communications and/or any other suitable user-related electronic communication data.

Each account may be identified by an email address, phone number, contact name and/or any other suitable account identifier. Each account may be identified via an account identifier associated with the electronic communication system through which the account was created.

Methods may include leveraging artificial intelligence ("AI") and quantum computing.

Methods may include monitoring electronic communications at a quantum gateway. The quantum gateway may control the electronic communication system to monitor electronic communications. The quantum gateway may monitor incoming electronic communications. The quantum gateway may monitor outgoing electronic communications. The quantum gateway may monitor both incoming and outgoing electronic communications. In some embodiments, a different quantum gateway may be used to monitor each account included in the electronic communication system. In certain embodiments, a single quantum gateway may be used to monitor multiple accounts included in the electronic communication system. In certain embodiments one quantum gateway may be used to monitor incoming electronic communication and one quantum gateway may be used to monitor outgoing electronic communications.

The quantum gateway may include a quantum processor. The quantum processor may operate using quantum bits ("qubits"). The quantum computing platform may include cooling hardware. The cooling hardware may be used to maintain the qubits within a few thousandths of a degree of absolute zero (kelvin). The qubits may be cooled to eliminate thermal noise and vibrations, which may destroy the information contained in the qubits.

For each account, the electronic communication system may store one or more electronic communications that were previously received at a historical electronic communication database. In some embodiments, the electronic communication system may store all/most electronic communications that were previously received at a historical electronic communication database. The historical electronic communication database may be a relational database, a cloud database, a network database, a hierarchical database, a centralized database and/or any other suitable type of database. For each account, methods may include generating, at the quantum gateway, a predictive analytic profile for each sender associated with an electronic communication from the stored electronic communications.

The predictive analytic profiles may be generated using a quantum predictor. The quantum predictor may be executed via the quantum processor. The quantum predictor may execute quantum predictive algorithms. Quantum predictive algorithms may include algorithms based on amplitude amplification, algorithms based on the quantum Fourier transform, algorithms based on quantum walks, algorithms based on quantum clustering, algorithms based on quantum machine learning, algorithms based on quantum neural networks and/or any other suitable quantum algorithms. Each algorithm may include a series of one or more quantum gates, such as but not limited to, identity gates, Pauli gates, controlled gates, phase shift gates, Hadamard gates, swap gates and Toffoli gates.

Generating the predictive analytic profiles may include isolating electronic communications associated with each sender into individual data capsules. Data capsules may include groups of data that are linked together. Each group of data may be isolated in a virtual container, in a specific location within the historical database, in a second database connected to the historical database and/or any other suitable isolation location. Each data capsule may be associated with a single sender.

Isolating electronic communications may include retrieving the electronic communications associated with each identified sender from the historical electronic communication database. Isolating electronic communications may include sorting the retrieved electronic communications by sender. Isolating electronic communications may include linking together electronic communications that are received from the same sender. Isolating electronic communications may include creating a data capsule from the linked electronic communications.

Generating the predictive analytic profiles may include identifying an electronic communication style for each sender. The electronic communication style may be identified by analyzing the electronic communications included in each data capsule. The analyzing may reveal comparisons, patterns and/or differences within the electronic communications included in each data capsule. The quantum predictor may analyze the electronic communications to determine the electronic communication style for each sender. Each electronic communication style may include word choices, language preferences, composition techniques and/or any suitable identifiers specific to each sender's composition style. For example, an electronic communication style may be a formatting style, a punctuation style, a wording style and/or any other suitable electronic communication style.

Generating the predictive analytic profiles may include predicting a predictive analytic profile for each sender based on the identified electronic communication style. The quantum predictor may use the identified electronic communication style to predict a generalized profile. The generalized profile may include components most likely to be included in an electronic communication from each sender. The quantum predictor may include quantum optimizers. The quantum optimizers may identify characteristics with a greater than a percentage of likeliness to be included in an electronic communication received by each sender. The characteristics with the greater than a percentage of likeliness may be included in the predictive analytic profile.

Generating the predictive analytic profiles may include storing the predictive analytic profile for each sender. The predictive analytic profiles for each sender may be stored at a memory location associated with the quantum gateway. The memory location may be a random-access memory ("RAM") location, read-only memory ("ROM") location, electrically erasable programmable read-only memory ("EEPROM") location, flash memory location, cache memory location and/or any suitable memory location. In some embodiments the predictive analytic profiles for each sender may be stored at the historical electronic database.

Methods may include filtering out compromised electronic communications at the quantum gateway. Methods may include using a dynamic quantum filter to filter out the compromised electronic communications. The dynamic quantum filter may execute in parallel with an AI model.

The AI model may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI model may update the progressive learning algorithms based on the generated outputs curated/retrieved from the analyzed correlations and patterns.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and generate outputs.

The dynamic quantum filter may filter out the compromised electronic communications using a dynamic condition set. The dynamic condition set may be based in part on an AI analysis of the electronic communications previously received by the electronic communication system. The AI model may render an analysis of the electronic communications previously received by the electronic communication system for each account. Based on the analysis, the AI model may identify a plurality of conditions. The plurality of conditions may include a maximum phishing score, a minimum quality rating, a threshold frequency measure and/or any other suitable quantifiable electronic communication metric. An electronic communication that satisfies the plurality of conditions may be in condition for receipt. The dynamic condition set may be different for each user account. The dynamic condition set may be different for each user account based on the AI analysis. The dynamic condition set may be the same for at least two accounts.

An electronic communication may be transmitted to a user via the electronic communication system. The electronic communication may be an incoming electronic communication. The quantum gateway may intercept the incoming electronic communication. The quantum gateway may intercept the incoming electronic communication before prior to the user receiving the electronic communication.

In response to receiving an incoming electronic communication at the quantum gateway, methods may include inserting a quantum signature into the incoming electronic communication. The quantum signature may be verifiable by a remote quantum processor. The quantum signature may include a group of quantum algorithms that may validate the authenticity of the electronic communication. Methods may further include encrypting the quantum signature with a quantum resilient encryption.

Inserting the quantum signature may include creating a reference signature. The reference signature may be a quantum signature that corresponds to the inserted quantum signature. The reference signature may be stored in a remote quantum database. The remote quantum database may be in quantum communication with the remote quantum processor. The reference signature may be stored in parallel with the insertion of the quantum signature into the incoming electronic communication. The reference signature may be identical to the quantum signature. The reference signature may be similar, over a threshold of similarity, to the quantum signature.

Methods may include identifying a sender that sent the incoming electronic communication. When the quantum gateway is monitoring a single account, the user of the single account may be a first user. When the user is a first user, one of the senders may be a second user. The second user may use the electronic communication system or a different electronic communication system to transmit an electronic communication to the account associated with the first user.

Methods may include retrieving a predictive analytic profile associated with the identified sender. The predictive analytic profile associated with the identified sender may be retrieved from the stored predictive analytic profiles. Methods may include comparing the incoming electronic communication with the retrieved predictive analytic profile.

Methods may include assigning condition values to the incoming electronic communication. The condition values may be identified based on the comparing. Each condition value may correspond to a condition included in the dynamic condition set. For example, condition values may include a phishing score, a quality rating, a frequency measure and/or any other suitable electronic communication metric. Methods may include determining whether the assigned condition values conform with the dynamic condition set. Methods may include determining whether the assigned condition values conform with the dynamic condition set. Condition values that conform with the dynamic condition set may include assigned condition values that are within a threshold value of the values identified for the dynamic condition set.

For example, a condition value may include a phishing score. The assigned phishing score may be 0.06%. The phishing score may correspond to the maximum phishing score included in the dynamic condition set. The maximum phishing score may be 2%. In response to determining that the assigned phishing score is less than the maximum phishing score, the condition value may be determined to conform with the dynamic condition set.

Prior to determining whether the assigned condition values conform with the dynamic condition set, methods may further include updating the quantum signature. The quantum signature may be updated based on the assigned condition values.

Methods may include updating the reference signature in response to updating the quantum signature. The updates to the reference signature may be the same as the updates to the quantum signature. The updates to the reference signature may be substantially the same as the updates to the quantum signature. The updates to the reference signature may correspond to the updates to the quantum signature. The updates may be implemented by updating the quantum signature and reference signature with the assigned condition values.

Updating the quantum signature may include overwriting the quantum signature with a second quantum signature based on the assigned condition values. The second quantum signature may be different from the first quantum signature.

In some embodiments, the quantum signature may not be updated.

The filtering may include preventing receipt of the incoming electronic communication when the assigned condition values fail to conform with the dynamic condition set. Alternatively, the filtering may include enabling receipt of the incoming electronic communication when the assigned condition values are determined conform with the dynamic condition set.

Prior to receiving the incoming electronic communication at the electronic communication system, methods may include verifying the quantum signature. Verifying the quantum signature may include comparing the updated quantum signature with the corresponding reference signature. The quantum signature may be verified using entanglement. The quantum signature may be verified using any suitable quantum verification.

Methods may further include forecasting a combination of condition values that indicates a compromised electronic communication. Methods may include forecasting the combination of condition values using the AI analysis of the electronic communications previously received by the electronic communication system. The forecasting may include analyzing electronic communications that have been prevented from being received to determine the combination of condition values. Methods may include flagging any electronic communication having been assigned condition values that correspond to the forecasted combination of condition values. Methods may also include using the forecasted combination of condition values to prevent the receipt of an electronic communication having been assigned the forecasted combination of condition values.

Methods may include updating the predictive analytic profiles for each sender. The predictive analytic profiles may be updated upon receipt of each incoming electronic communication at the electronic communication system. The predictive analytic profiles may be updated in response to detecting that an incoming electronic communication has been prevented from being received by the electronic communication system. The predictive analytic profiles may be updated based on the content of each incoming electronic communication. The predictive analytic profiles may be updated based on the condition values assigned to each incoming electronic communication. The predictive analytic profiles may be updated based on any suitable updating data.

Methods may include updating the dynamic quantum filter. Methods may include updating the dynamic quantum filter upon receipt of each incoming electronic communication at the electronic communication system. Methods may include updating the dynamic quantum filter in response to detecting that an incoming electronic communication has been prevented from being received by the electronic communication system. The dynamic quantum filter may be updated based on the content of each incoming electronic communication. The dynamic quantum filter may be updated based on the condition values assigned to each incoming electronic communication. The dynamic quantum filter may be updated based on any suitable updating data.

In some embodiments, the sender associated with the incoming electronic communication may not have a corresponding predictive analytic profile. In such embodiments, the sender may be a first-time sender. Accordingly, the user may not have received any prior electronic communications from the sender. In response to failing to retrieve a corresponding predictive analytic profile, methods may include generating a global (nonspecific to a user) profile. The global profile may be determined based on a threshold security level. The threshold security level may be determined by analyzing the condition values assigned to previously received electronic communications. The threshold security level may be preset security level. The threshold security level may be selected by the user.

After generating the global profile, methods may include comparing the incoming electronic communication to the global profile. The methods may include assigning condition values to the incoming electronic communication. The condition values may be assigned based on the comparison.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Systems, apparatus and methods for detecting, monitoring and forecasting compromised electronic communications.

The apparatus may include an electronic communication system. The electronic communication system may be executed on a computing device.

The electronic communication system may be an email system, a short messaging service ("SMS") system, a multimedia messaging service ("MMS") system and/or any other suitable electronic communication system configured to transmit and receive electronic communications. Electronic communications may include emails, SMS messages, MMS messages and/or any other suitable electronic communication configured to be transmitted and received through an electronic communication system. The computing device may include a desktop computer, a laptop, a smartphone, a tablet and/or any other suitable computing device.

The apparatus may include a monitoring module. The monitoring module may be executed via the computing device. The computing device may include a processor. The monitoring module may be executed using the processor. The monitoring module may include a quantum predictor. The quantum predictor may include a quantum processor. The quantum processor may operate using quantum bits ("qubits"). The quantum computing platform may include cooling hardware. The cooling hardware may be used to maintain the qubits within a few thousandths of a degree of absolute zero (kelvin). The qubits may be cooled to eliminate thermal noise and vibrations, which may destroy the information contained in the qubits.

The monitoring module may include an AI model. The AI model may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI model may update the progressive learning algorithms based on the generated outputs curated/retrieved from the analyzed correlations and patterns.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and generate outputs.

The monitoring module may monitor electronic communications using a quantum gateway. The quantum gateway may control the electronic communication system to monitor incoming and outgoing electronic communications. The monitoring module may generate, using the quantum predictor, a predictive analytic profile for each sender associated with an electronic communication previously received by the electronic communication system.

The quantum predictor may execute quantum predictive algorithms. Quantum predictive algorithms may include algorithms based on amplitude amplification, algorithms based on the quantum Fourier transform, algorithms based on quantum walks, algorithms based on quantum clustering, algorithms based on quantum machine learning, algorithms based on quantum neural networks and/or any other suitable quantum algorithms. Each algorithm may include a series of one or more quantum gates, such as but not limited to, identity gates, Pauli gates, controlled gates, phase shift gates, Hadamard gates, swap gates and Toffoli gates.

The quantum predictor may isolate electronic communications associated with each identified sender into individual data capsules. The electronic communications may be retrieved from a historical electronic communication database. The historical electronic communication database may be a relational database, a cloud database, a network database, a hierarchical database, a centralized database and/or any other suitable type of database. The historical electronic communication database may store the electronic communications that were previously received by the electronic communication system.

Each data capsule may be associated with a single sender. Each data capsule may include a group of data that is linked together. The group of data may be isolated in a virtual container, in a specific location within the historical database, in a second database connected to the historical database and/or any other suitable isolation location.

The quantum predictor may identify an electronic communication style for each sender. The electronic communication style may be identified by analyzing the electronic communications included in each data capsule. The analyzing may reveal comparisons, patterns and/or differences within the electronic communications included in each data capsule. The quantum predictor may analyze the electronic communications to determine an electronic communication style for each sender. Each electronic communication style may include word choices, language preferences, composition techniques and/or any suitable identifiers specific to each sender's composition style. For example, an electronic communication style may be a formatting style, a punctuation style, a wording style and/or any other suitable electronic communication style.

The quantum predictor may predict the predictive analytic profile for each sender based on the identified electronic communication style. The quantum predictor may use the identified electronic communication style to predict a generalized profile. The generalized profile may include components most likely to be included in an electronic communication from each sender. The quantum predictor may include quantum optimizers. The quantum optimizers may identify characteristics that have a greater than a percentage of likeliness to be included the predictive analytic profile.

The quantum predictor may store the predictive analytic profile for each sender at a memory location associated with the monitoring module. The predictive analytic profiles may be stored at a memory location associated with the quantum gateway. The memory location may be a random-access memory ("RAM") location, read-only memory ("ROM") location, electrically erasable programmable read-only memory ("EEPROM") location, flash memory location, cache memory location and/or any suitable memory location. In some embodiments the predictive analytic profiles for each sender may be stored at the historical electronic database.

The monitoring module may filter out compromised electronic communications using a dynamic quantum filter. The dynamic quantum filter may execute in parallel with the AI model. The dynamic quantum filter may use a dynamic condition set to filter out the compromised electronic communications. The dynamic condition set may be determined, at least in part, from an AI analysis of the electronic communications that were previously received by the electronic communication system. The AI model may render an analysis of the previously received electronic communications. Based on the analysis the AI model may identify a plurality of conditions. The plurality of conditions may include a maximum phishing score, a minimum quality rating, a threshold frequency measure and/or any other suitable quantifiable electronic communication metric.

In response to receiving an incoming electronic communication at the quantum gateway, the monitoring module may insert a quantum signature into the incoming electronic communication. The quantum signature may be verifiable by a remote quantum processor. The quantum signature may include a group of quantum algorithms configured to be used to validate the authenticity of the electronic communication. The quantum signature may be encrypted using a quantum resilient encryption.

The monitoring module may create a reference signature. The reference signature may be a quantum signature that corresponds to the inserted quantum signature. The reference signature may be stored in a remote quantum database. The remote quantum database may be in quantum communication with the remote quantum processor. The reference signature may be stored in in parallel with the insertion of the quantum signature into the incoming electronic communication. The reference signature may be identical to the quantum signature. The reference signature may be similar within a threshold level of similarity to the quantum signature.

The dynamic quantum filter may identify a sender that sent the incoming electronic communication. The dynamic quantum filter may retrieve a predictive analytic profile associated with the identified sender. The dynamic quantum filter may compare the incoming electronic communication with the retrieved predictive analytic profile. The dynamic quantum filter may assign condition values to the incoming electronic communication based on the comparison. Each condition value may correspond to a condition included in the dynamic condition set. For example, condition values may include a phishing score, a quality rating, a frequency measure and/or any other suitable electronic communication metric. The phishing score may correspond to the maximum phishing score, the quality rating may correspond to the minimum quality rating, and the frequency measure may correspond to the threshold frequency measure.

The monitoring module may update the quantum signature inserted into the incoming electronic communication based on the assigned condition values. The monitoring module may update the reference signature in response to updating the quantum signature. The updates to the reference signature may be the same as the updates to the quantum signature. The updates to the reference signature may be substantially the same as the updates to the quantum signature. The updates to the reference signature may correspond to the updates to the quantum signature. The updates may be implemented by updating the quantum signature and reference signature with the assigned condition values. The updates may be implemented by updating the quantum signature and reference signature with any suitable updates.

Updating the quantum signature may include overwriting the quantum signature with a second quantum signature based on the assigned condition values. The second quantum signature may be different from the first quantum signature.

The dynamic quantum filter may determine whether the assigned condition values conform with the dynamic condition set. Condition values that conform with the dynamic condition set may include assigned condition values that are within a threshold value of the values determined for the dynamic condition set. In response to determining that the assigned condition values fail to conform with the dynamic condition set, the monitoring module may prevent receipt of the incoming electronic communication at the electronic communication system. In response to determining that the assigned condition values conform with the dynamic condition set, the monitoring module may enable receipt of the incoming electronic communication at the electronic communication system.

Prior to receiving the incoming electronic communication, the monitoring module may verify the quantum signature. The monitoring module may verify the quantum signature by comparing the updated quantum signature with the corresponding reference signature. The quantum signature may be verified using entanglement. The quantum signature may be verified using any suitable quantum verification.

The dynamic quantum filter may forecast a combination of condition values that indicates a compromised electronic communication. The dynamic quantum filter may forecast the combination of condition values using the AI analysis of the previously received electronic communications. The dynamic quantum filter may analyze electronic communications that have been prevented from being transmitted to determine the combination of condition values. The monitoring module may flag any electronic communication that has been assigned condition values that correspond to the forecasted combination of condition values. The monitoring module may use the forecasted combination of condition values to prevent the receipt of an electronic communication that has been assigned the forecasted combination of condition values.

The monitoring module may continually update the predictive analytic profile. The monitoring module may continually update the dynamic quantum filter.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
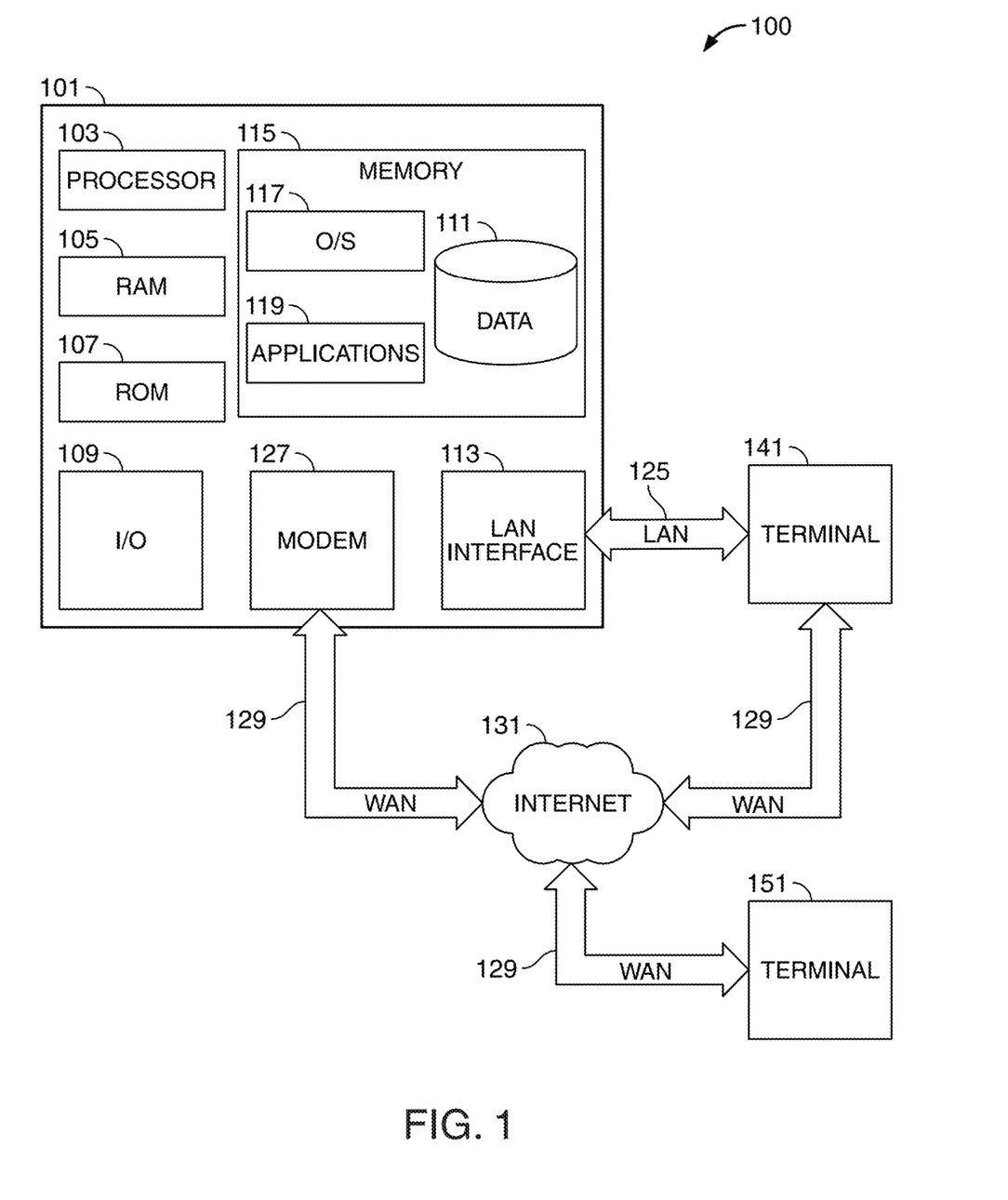
FIG. 1 shows an illustrative diagram in accordance with principles of the disclosure.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone and/or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text and/or audio assistance files. The data stored in memory 115 may also be stored in cache memory and/or any other suitable memory.

I/O module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
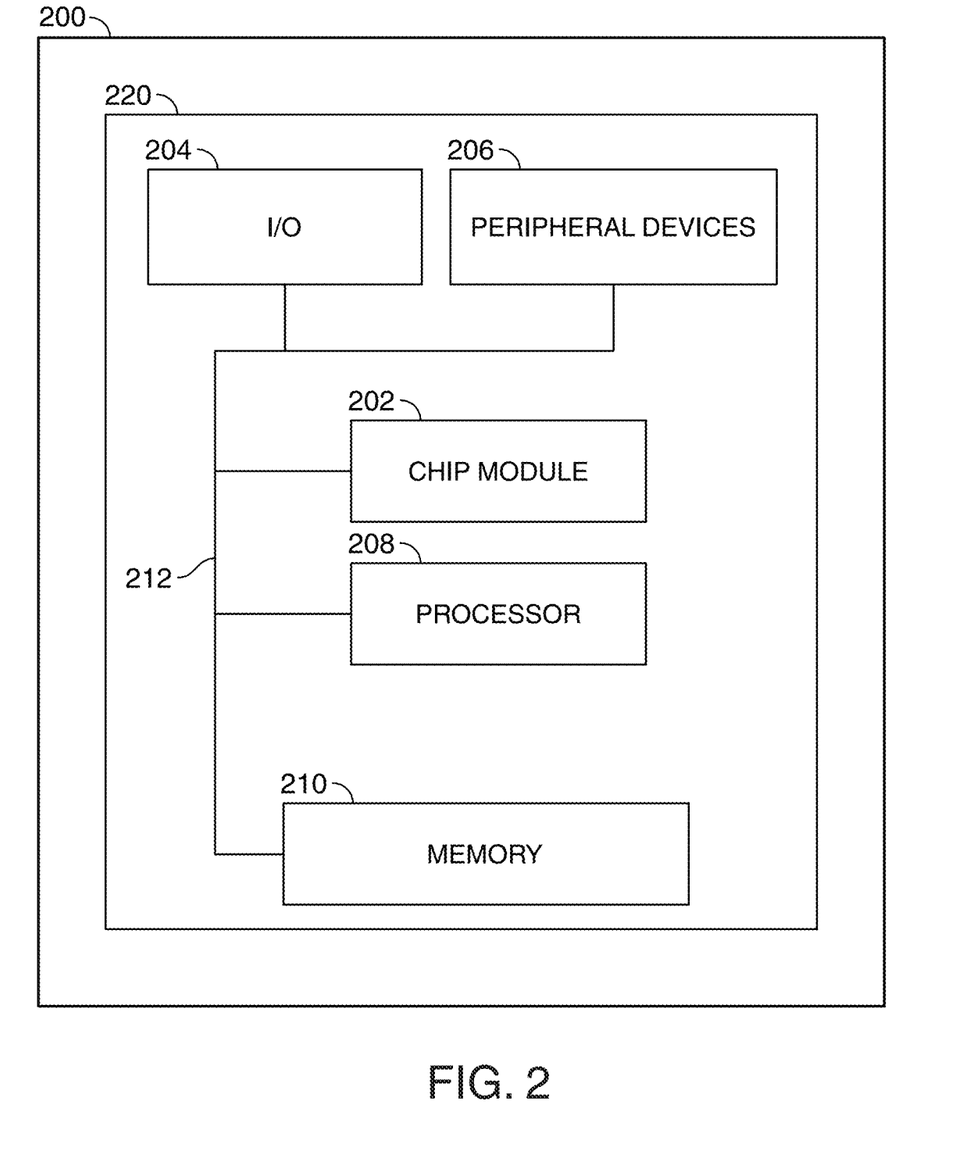
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
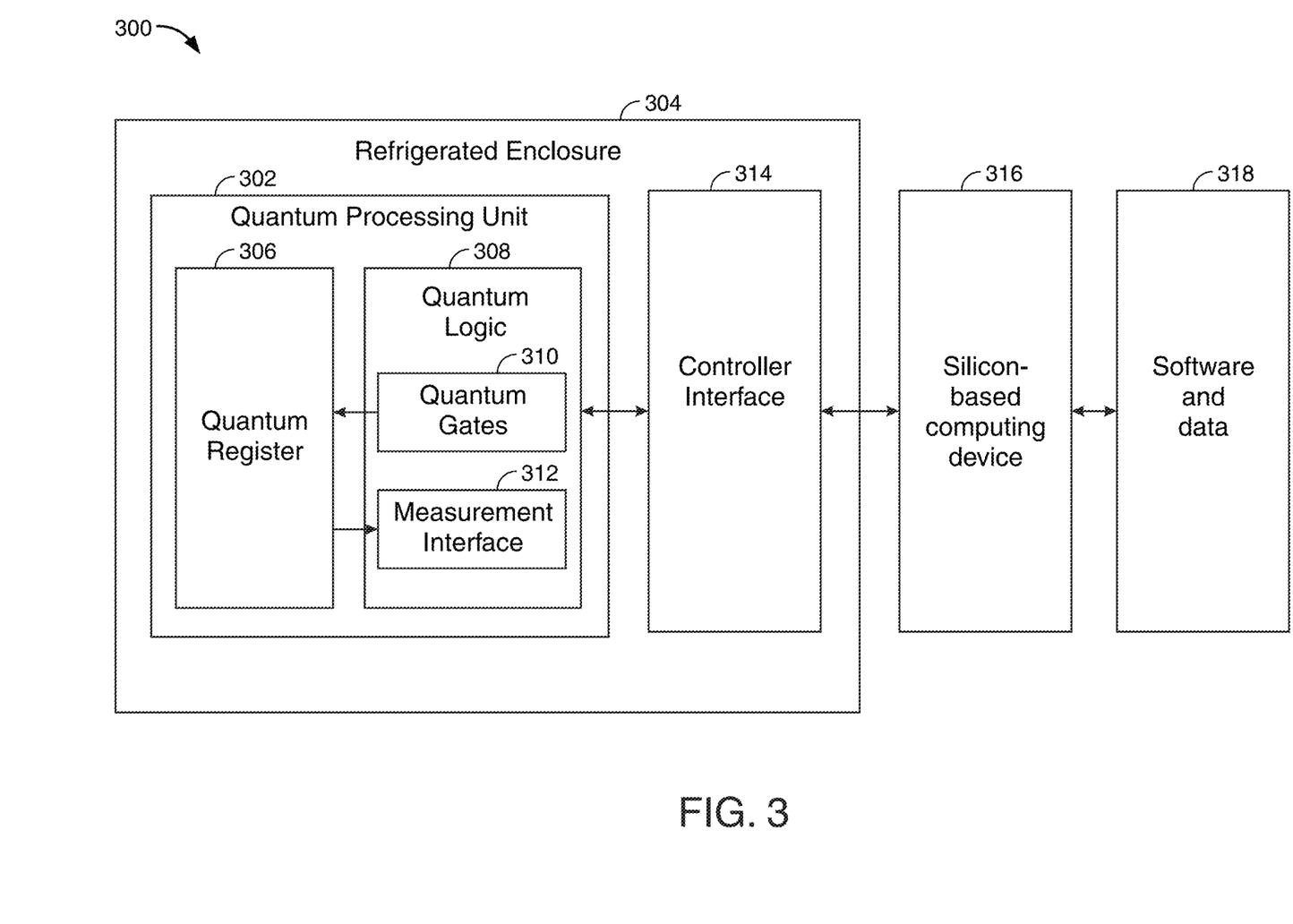
FIG. 3 shows yet another illustrative diagram in accordance with principles of the disclosure.

FIG. 3 shows illustrative block diagram of system 300. System 300 may include quantum processing unit 302. Quantum processing unit 302 may be a processing unit that uses quantum principles to perform tasks. Quantum processing unit 302 may include quantum register 306. Quantum processing unit 302 may include quantum logic 308. Quantum logic 308 may include quantum gates 310 and measurement interface 312.

Quantum register 306 may be comprised of qubits. Each qubit may have a state of either zero or one, like a classical bit. However, unlike a classical bit, a qubit may have a superposition state. The superposition state may be a state in which the qubit exists as all possible states simultaneously. In order to maintain the qubits in a superposed state, the qubits are preserved at close to absolute zero degrees (kelvin). Refrigerated enclosure 304 may maintain the qubits at close to absolute zero degrees (kelvin).

Quantum gates 310 may include quantum algorithms, such as algorithms based on amplitude amplification, algorithms based on the quantum Fourier transform, algorithms based on quantum walks and/or any other suitable quantum algorithms. Each algorithm may include a series of one or more quantum gates, such as but not limited to identity gates, Pauli gates, controlled gates, phase shift gates, Hadamard gates, swap gates and Toffoli gates. Measurement interface 312 may measure a state of each qubit after being processed by the algorithms included in quantum gates 310. The measured state of each qubit may be a finite state.

The measured state may be transmitted to controller interface 314. Controller interface 314 may enable information to be transmitted between quantum processing unit 302 and silicon-based computing device 316. The measured state may be transmitted to silicon-based computing device 316. Silicon-based computing device 316 may include software and data 318. Software and data 318 may be used to process the measured state that was transmitted from quantum processing unit 302. Silicon-based computing device 316 may transmit data included in software and data 318 to controller interface 314. Controller interface 314 may transmit the data to quantum processing unit 302 to be processed and analyzed.

Figure 4:
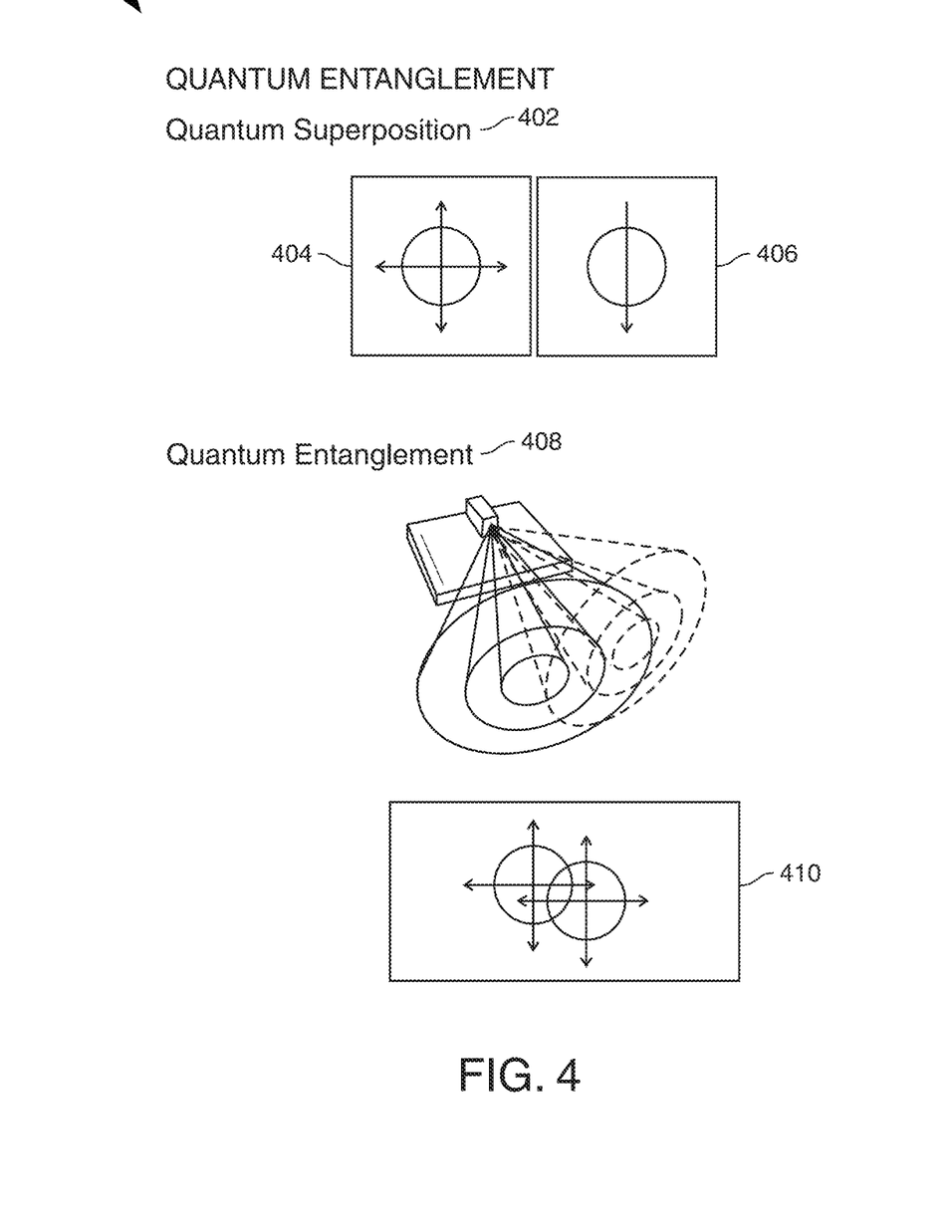
FIG. 4 shows yet another illustrative diagram in accordance with principles of the disclosure.

FIG. 4 shows illustrative diagram 400. Illustrative diagram 400 may have one or more features in common with system 300. Illustrative diagram 400 may include quantum superposition, as shown at 402. The rules of quantum physics state that an unobserved quantum particle, such as a photon, exists in all possible states simultaneously, as shown at 404. However, when observed or measured, the quantum particle collapses into one state, as shown at 406 (spin-down).

Quantum entanglement, shown at 408, may occur when two quantum particles become connected. A laser beam fired through a certain type of crystal can cause individual photons to be split into pairs of entangled photons. A pair of entangled particles may be shown at 410.

Figure 5:
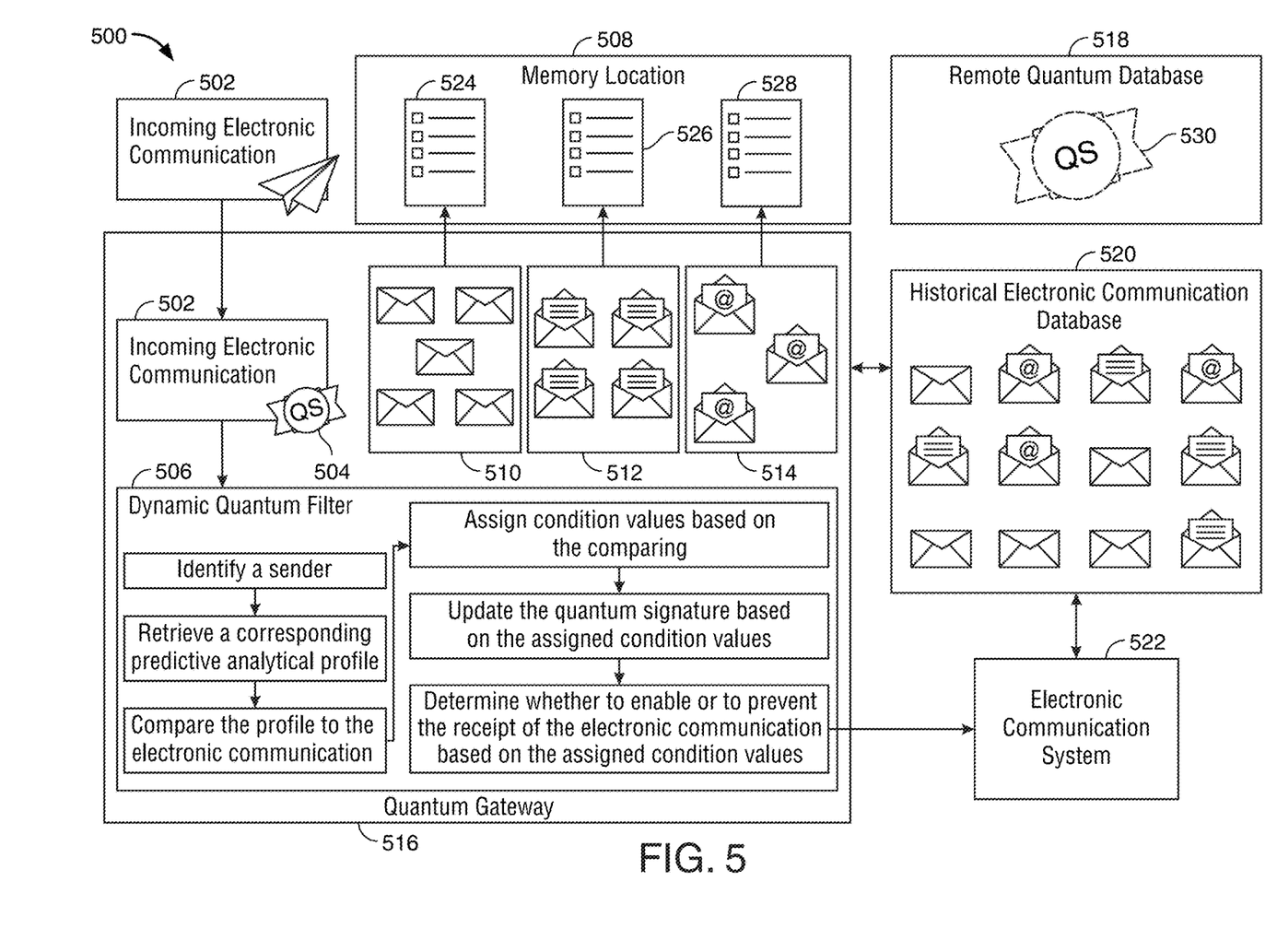
FIG. 5 shows yet another illustrative diagram in accordance with principles of the disclosure.

FIG. 5 shows illustrative electronic communication monitoring system 500. Electronic communication 502 may be sent from a sender. Electronic communication 502 may be sent to a user. The user may have a user account on electronic communication system 522. Electronic communication system 522 may be operated by an entity. Quantum gateway 506 may intercept electronic communication 502 before electronic communication 502 is received at electronic communication system 522.

Electronic communication system 522 may be executed on a computing device. The computing device may include a desktop computer, a laptop, a tablet, a smartphone and/or any other suitable computing device. The computing device may have one or more features in common with one or more of computer 101 and apparatus 200. Quantum gateway 516 may be executed using a quantum processor. Quantum gateway 516 may have one or more features in common with system 300.

Quantum gateway 516 may be electronically connected to electronic communication system 522. Electronic communication system 522 may be electronically connected to historical electronic communication database 520. Quantum gateway 516 may be electronically connected to historical electronic communication database 520. Historical electronic communication database 520 may store a plurality of electronic communications. The previously received electronic communications may be associated with a plurality of different senders.

Quantum gateway 516 may retrieve the plurality of previously received electronic communications from historical electronic communication database 520. Quantum gateway 516 may sort the previously received electronic communications based on the sender identified for each electronic communication. Quantum gateway 516 may isolate electronic communications from each sender in a data capsule. For example, quantum gateway 516 may isolate a first group of electronic communications into data capsule 510. Quantum gateway 516 may isolate a second group of electronic communications into data capsule 512. Quantum gateway 516 may isolate a third group of electronic communications into data capsule 514. Electronic communications isolated in data capsule 510 may correspond to a first sender. Electronic communications isolated in data capsule 512 may correspond to a second sender. Electronic communications isolated in data capsule 514 may correspond to a third sender.

After isolating electronic communications in data capsules, quantum gateway 516 may generate a predictive analytic profile for each sender. Quantum gateway 516 may use quantum algorithms to analyze the electronic communications stored in each data capsule. Quantum gateway 516 may identify a electronic communication style for each sender based on the analysis of the electronic communications stored in each data capsule. Using the identified electronic communication style, quantum gateway 516 may generate a predictive analytic profile for each sender.

For example, quantum gateway 516 may generate predictive analytic profile 524 based on the electronic communication style identified by the electronic communications stored in data capsule 510. Predictive analytic profile 524 may correspond to the first sender. Quantum gateway 516 may generate predictive analytic profile 526, based on the electronic communication style identified by the electronic communications stored in data capsule 512. Predictive analytic profile 526 may correspond to the second sender. Quantum gateway 516 may generate predictive analytic profile 528, based on the electronic communication style identified by the electronic communications stored in data capsule 514. Predictive analytic profile 528 may correspond to the third sender. Quantum gateway 516 may store predictive analytic profiles 524, 526 and 528 in memory module 508.

Quantum signature 504 may be inserted into electronic communication 502 after electronic communication 502 is intercepted by quantum gateway 516. In parallel to the insertion of quantum signature 504, reference signature 530 may be stored in remote quantum database 518. Reference signature 530 may correspond to quantum signature 504.

After quantum signature 504 is inserted, electronic communication 502 may be filtered through dynamic quantum filter 506, dynamic quantum filter 506 may filter electronic communication 502 using a dynamic condition set. The dynamic condition set may be identified using an AI model (not shown). The AI model may analyze the plurality of electronic communications that have been previously received from different senders to identify the dynamic condition set. The dynamic condition set may include a maximum phishing score, a minimum quality rating, a threshold frequency measure and/or any other suitable quantifiable electronic communication metric.

Dynamic quantum filter 506 may identify a sender of electronic communication 502. After identifying a sender, dynamic quantum filter 506 may retrieve a predictive analytic profile corresponding to the identified sender from memory location 508. For example, when the sender of electronic communication 502 is identified as the first sender, then dynamic quantum filter 506 may retrieve predictive analytic profile 524 from memory location 508.

After retrieving the corresponding predictive analytic profile, dynamic quantum filter 506 may compare electronic communication 502 to the corresponding predictive analytic profile. In response to the comparing, dynamic quantum filter 506 may assign condition values to electronic communication 502. Condition values may include a phishing score, a quality rating, a frequency measure and/or any other suitable electronic communication metric. Each condition value may correspond to one condition included in the dynamic condition set. The phishing score may correspond to the maximum phishing score, the quality rating may correspond to the minimum quality rating, and the frequency measure may correspond to the threshold frequency measure.

After assigning condition values, dynamic quantum filter 506 may update quantum signature 504. Dynamic quantum filter 506 may update quantum signature 504 based on the assigned condition values. Updating quantum signature 504 may include updating reference signature 530 with a corresponding update. After updating quantum signature 504, dynamic quantum filter 506 may determine whether to enable or prevent receipt of electronic communication 502 at electronic communication system 522. When dynamic quantum filter 506 determines that the assigned condition values conform with the dynamic condition set, dynamic quantum filter 506 may enable the receipt of electronic communication 502. When dynamic quantum filter 506 determines that the assigned condition values fail to conform with the dynamic condition set, dynamic quantum filter 506 may prevent the receipt of electronic communication 502.

Prior to receiving electronic communication 502 at electronic communication system 522, quantum signature 504 may be verified. Quantum signature 504 may be verified by comparing quantum signature 504 to reference signature 530. Quantum signature 504 may be compared to reference signature 530 using quantum entanglement and/or any other suitable comparing methods. Based on the comparing, quantum signature 504 may be verified. Once quantum signature 504 is verified, electronic communication 502 may be received by electronic communication system 522.

Figure 6:
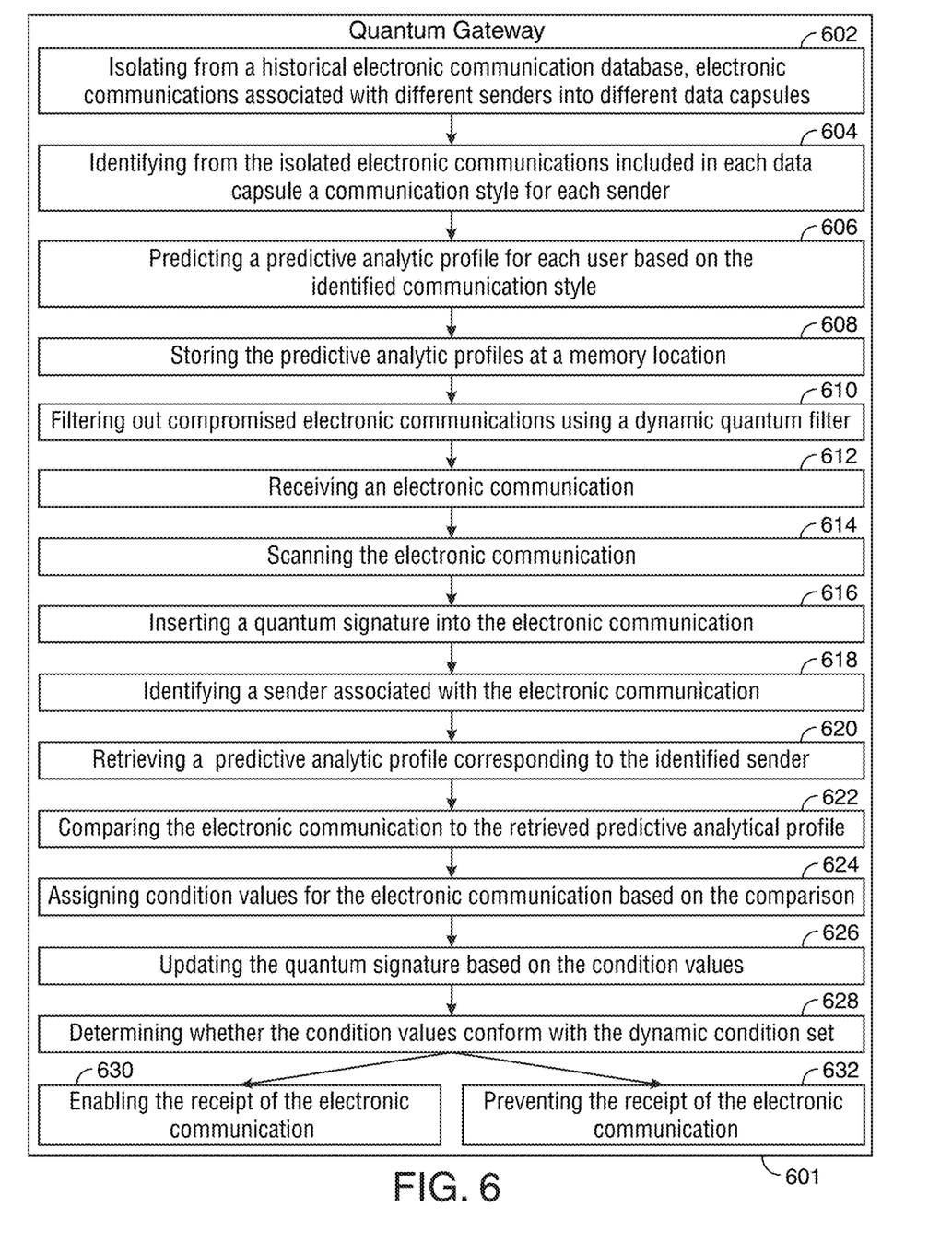
FIG. 6 shows yet another illustrative diagram in accordance with principles of the disclosure.

FIG. 6 shows illustrative quantum gateway 601. Quantum gateway 601 may include one or more features in common with electronic communication monitoring system 500. At step 602, quantum gateway 601 may isolate historical electronic communications. Quantum gateway 601 may sort the historical electronic communications into data capsules based on senders identified for each electronic communication.

At step 604, quantum gateway 601 may identify, using the electronic communications included in each data capsule, an electronic communication style for each sender. Step 606 may include predicting a predictive analytic profile for each sender based on the identified communication style. The predictive analytic profiles may be stored at a memory location associated with quantum gateway 601 at step 608.

At step 610, quantum gateway 601 may filter out compromised communications using a dynamic quantum filter. The dynamic quantum filter may filter out the compromised electronic communications using a dynamic condition set.

Quantum gateway 601 may receive an electronic communication at step 612. In response to receiving the electronic communication, step 614 may include scanning the electronic communication. Step 616 may include inserting a quantum signature into the electronic communication.

Step 618 may include identifying a sender associated with the electronic communication. The sender may be identified based on the scanning from step 614. Step 620 may include retrieving a predictive analytic profile corresponding to the identified sender. At step 622, the electronic communication may be compared to the retrieved predictive analytic profile. Step 624 may include assigning condition values to the electronic communication based on the comparison. Each condition value may correspond to one condition from the dynamic condition set.

The quantum signature may be updated based on the assigned condition values at step 626. After updating the quantum signature, step 628 may include determining whether the assigned condition values conform with the dynamic condition set. In response to determining that the assigned condition values conform to the dynamic condition set, step 630 may enable the receipt of the electronic communication. In response to determining that the assigned condition values fail to conform to the dynamic condition set, step 632 may include preventing the receipt of the electronic communication.

Thus, methods and apparatus for DETECTING, MONITORING AND FORECASTING COMPROMISED ELEC- TRONIC COMMUNICATIONS are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for detecting, monitoring and forecasting for compromised electronic communications in an electronic communication system, the method leveraging artificial intelligence ("AI") and quantum computing, the method comprising:

monitoring electronic communications at a quantum gateway, the quantum gateway controlling the electronic communication system to monitor electronic communications;

generating, at the quantum gateway, a predictive analytic profile for each sender associated with an electronic communication previously received by the electronic communication system, the generating using a quantum predictor, the quantum predictor executing quantum predictive algorithms, the generating of the predictive analytic profiles comprising:

isolating, from a historical electronic communication database storing the electronic communications previously received by the electronic communication system, electronic communications associated with each sender into individual data capsules, each data capsule being associated with a single sender;

identifying, from isolated electronic communications included in each data capsule, an electronic communication style for each sender, each electronic communication style comprising word choices, language preferences and composition techniques specific to each sender;

predicting the predictive analytic profile for each sender based on the identified electronic communication style; and storing the predictive analytic profile for each sender at a memory location associated with the quantum gateway;

filtering out compromised electronic communications at the quantum gateway using a dynamic quantum filter, the dynamic quantum filter executing in parallel with an AI model, the dynamic quantum filter using a dynamic condition set, the dynamic condition set being based in part on an AI analysis of the electronic communications previously received by the electronic communication system, the filtering comprising:

in response to receiving an incoming electronic communication at the quantum gateway, inserting a quantum signature into the incoming electronic communication, the quantum signature being verifiable by a remote quantum processor; and identifying a sender that sent the incoming electronic communication;

retrieving a predictive analytic profile associated with the identified sender;

comparing the incoming electronic communication with the retrieved predictive analytic profile;

assigning condition values to the incoming electronic communication based on the comparing, each condition value corresponding to a condition included in the dynamic condition set;

determining if the assigned condition values conform with the dynamic condition set; and enabling receipt of the incoming electronic communication when the assigned condition values are determined conform with the dynamic condition set.

2. The method of claim 1 further including overwriting the quantum signature with a second quantum signature based on the assigned condition values.

3. A method for detecting, monitoring and forecasting for compromised electronic communications in an electronic communication system, the method leveraging artificial intelligence ("AI") and quantum computing, the method comprising:

monitoring electronic communications at a quantum gateway, the quantum gateway controlling the electronic communication system to monitor electronic communications;

generating, at the quantum gateway, a predictive analytic profile for each sender associated with an electronic communication previously received by the electronic communication system, the generating using a quantum predictor, the quantum predictor executing quantum predictive algorithms, the generating of the predictive analytic profiles comprising:

isolating, from a historical electronic communication database storing the electronic communications previously received by the electronic communication system, electronic communications associated with each sender into individual data capsules, each data capsule being associated with a single sender;

identifying, from isolated electronic communications included in each data capsule, an electronic communication style for each sender, each electronic communication style comprising word choices, language preferences and composition techniques specific to each sender;

predicting the predictive analytic profile for each sender based on the identified electronic communication style; and storing the predictive analytic profile for each sender at a memory location associated with the quantum gateway;

filtering out compromised electronic communications at the quantum gateway using a dynamic quantum filter, the dynamic quantum filter executing in parallel with an AI model, the dynamic quantum filter using a dynamic condition set, the dynamic condition set being based in part on an AI analysis of the electronic communications previously received by the electronic communication system, the filtering comprising:

in response to receiving an incoming electronic communication at the quantum gateway, inserting a quantum signature into the incoming electronic communication, the quantum signature being verifiable by a remote quantum processor; and identifying a sender that sent the incoming electronic communication;

retrieving a predictive analytic profile associated with the identified sender;

comparing the incoming electronic communication with the retrieved predictive analytic profile;

assigning condition values to the incoming electronic communication based on the comparing, each condition value corresponding to a condition included in the dynamic condition set;

updating the quantum signature inserted into the incoming electronic communication based on the assigned condition values; and determining if the assigned condition values conform with the dynamic condition set.

4. The method of claim 3 wherein the filtering further comprises preventing receipt of the incoming electronic communication when the assigned condition values fail to conform with the dynamic condition set.

5. The method of claim 3 wherein the filtering further comprises enabling receipt of the incoming electronic communication when the assigned condition values are determined conform with the dynamic condition set.

6. The method of claim 3 further comprising storing a reference signature that corresponds to the quantum signature in a remote quantum database in parallel with the insertion of the quantum signature into the incoming electronic communication.

7. The method of claim 6 further comprising updating the reference signature in response to updating the quantum signature.

8. The method of claim 7 further including verifying the quantum signature by comparing the updated quantum signature with the corresponding reference signature prior to enabling receipt of the incoming electronic communication.

9. The method of claim 3 further comprising encrypting the quantum signature with a quantum resilient encryption.

10. The method of claim 3 further comprising forecasting a combination of condition values that indicate a compromised electronic communication based on the AI analysis of the electronic communications previously received by the electronic communication system.

11. The method of claim 10 further comprising using the forecasted combination of condition values to prevent receipt of an electronic communication having been assigned the forecasted combination of condition values.

12. An apparatus for detecting, monitoring and forecasting for compromised electronic communications, the apparatus leveraging artificial intelligence ("AI") and quantum computing, the apparatus comprising:
an electronic communication system executing on a computing device; and
a monitoring module, the monitoring module executing on the computing device, the monitoring module including a quantum predictor and an AI model, the monitoring module configured to:
monitor electronic communications at a quantum gateway, the quantum gateway configured to control the electronic communication system to monitor electronic communications;
generate, using the quantum predictor, a predictive analytic profile for each sender associated with electronic communications previously received by the electronic communication system, the quantum predictor configured to:
execute quantum predictive algorithms;
isolate electronic communications associated with each sender into individual data capsules, the electronic communications being isolated from a historical electronic communication database configured to store the electronic communications previously received by the electronic communication system, each data capsule being associated with a single sender;
identify, from the electronic communications included in each data capsule, an electronic communication style for each sender, each electronic communication style comprising word choices, language preferences and composition techniques specific to each sender;
predict the predictive analytic profile for each sender based on the identified electronic communication style; and
store the predictive analytic profile for each sender at a memory location associated with the monitoring module; and
filter out compromised electronic communications at the quantum gateway using a dynamic quantum filter, the dynamic quantum filter configured to execute a quantum processor, the dynamic quantum filter configured to execute in parallel with the AI model, the dynamic quantum filter configured to use a dynamic condition set, the dynamic condition set being based in part on an AI analysis of the electronic communications previously received by the electronic communication system, the dynamic quantum filter configured to:
in response to receiving an incoming electronic communication at the quantum gateway, insert a quantum signature into the incoming electronic communication, the quantum signature being verifiable by a remote quantum processor;
identify a sender that sent the incoming electronic communication;
retrieve a predictive analytic profile associated with the identified sender;
compare the incoming electronic communication with the retrieved predictive analytic profile;
assign condition values to the incoming electronic communication based on the comparison, each condition value corresponding to a condition included in the dynamic condition set;
update the quantum signature inserted into the incoming electronic communication based on the assigned condition values; and
determine if the assigned condition values conform with the dynamic condition set.

13. The apparatus of claim 12 wherein the monitoring module is further configured to prevent receipt of the incoming electronic communication when the assigned condition values fail to conform with the dynamic condition set.

14. The apparatus of claim 12 wherein the monitoring module is further configured to enable receipt of the incoming electronic communication when the assigned condition values are determined to conform with the dynamic condition set.

15. The apparatus of claim 12 wherein the monitoring module is further configured to store a reference signature, which corresponds to the quantum signature, in a remote quantum database in parallel with the insertion of the quantum signature into the incoming electronic communication.

16. The apparatus of claim 15 wherein the monitoring module is further configured to update the reference signature in response an update of the quantum signature.

17. The apparatus of claim 16 wherein the monitoring module is further configured to verify the quantum signature by comparing the updated quantum signature with the corresponding reference signature prior to enabling receipt of the incoming electronic communication.

18. The apparatus of claim 12 wherein the monitoring module is further configured to encrypt the quantum signature with a quantum resilient encryption.

19. The apparatus of claim 12 wherein the monitoring module is further configured to forecast a combination of condition values that indicate a compromised electronic communication based on the AI analysis of the electronic communications previously received by the electronic communication system.

20. The apparatus of claim 19 wherein the monitoring module is further configured to use the forecasted combination of condition values to prevent receipt of an electronic communication having been assigned the forecasted combination of condition values.

\* \* \* \* \*